A. B. Hester,
Sash Balance.
N° 79,118. Patented June 23, 1868.
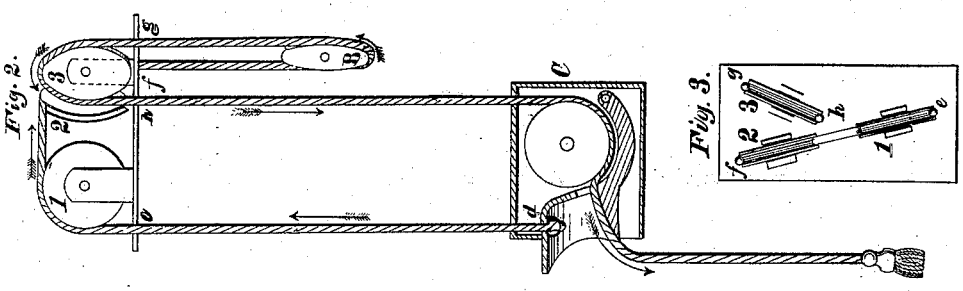
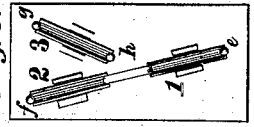
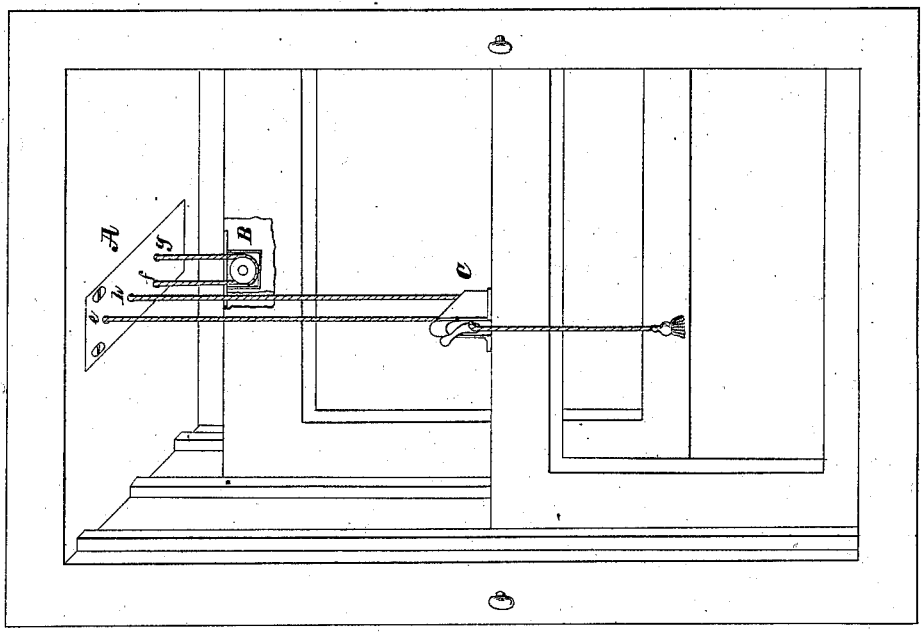

United States Patent Office.

ANDREW B. HESTER, OF NORTH VERNON, INDIANA.

Letters Patent No. 79,118, dated June 23, 1868.

IMPROVEMENT IN SASH-BALANCE.

The Schedule referred to in these Letters Patent and making part of the same.

TO ALL WHOM IT MAY CONCERN:

Be it known that I, ANDREW B. HESTER, of North Vernon, in the county of Jennings, and State of Indiana, have invented a new and useful Improvement on the Sash-Balance, for which a patent was granted to me, dated November 1, 1864, and numbered 44,866; and I do hereby declare that the following is a full, clear, and exact description of the construction and operation of the same, reference being had to the annexed drawings, making a part of this specification, in which—

Figure 1 is a view of the window from the room with the sash suspended, the cord K arranged with this improvement.

Figure 2 is a side view of the apparatus C, the pulleys at A and B, and the cord as arranged thereon.

Figure 3 is a top view of the plate A, and the three pulleys as arranged thereon.

The object and effect of this improvement are that the cord moves in perpendicular and parallel lines, causing less friction and greater neatness of appearance.

The cord is attached to the lever F in the apparatus C at $d$, thence passes up through the plate A at $e$, thence over the pulley 1 to the pulley 2, thence down through the plate A at $f$, and around the pulley B, thence up through the plate A at $g$, then over the pulley 3, and down again through the plate A at $h$, and thence down to the apparatus C, and through the clasp therein.

What I claim as my invention, and for which I desire Letters Patent, is—

The sash-balance, consisting of the plate A, with the pulleys 1 2 3 as arranged thereon, the pulley B, the cord K, the cap C, and the lever F, the whole constituted and arranged substantially as described.

ANDREW B. HESTER.

Witnesses:
JOHN SCHIERLING,
GEORGE HELMICH.